United States Patent
Amit et al.

(10) Patent No.: US 7,331,029 B2
(45) Date of Patent: Feb. 12, 2008

(54) METHOD AND SYSTEM FOR ENHANCING CIRCUIT DESIGN PROCESS

(75) Inventors: Niv Amit, Givat Shmuel (IL); Ronit Bustin, Ra'anana (IL); Lidor Goren, Netanya (IL); Omer Heymann, Tel Aviv-Jaffa (IL); Moshe Leibowitz, Haifa (IL); Gil Noy, Ramat Gan (IL); Alex Raphayevich, Kiryat Ekron (IL); Maya Speiser, Tel Aviv-Jaffa (IL)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 11/232,746

(22) Filed: Sep. 22, 2005

(65) Prior Publication Data

US 2007/0067748 A1   Mar. 22, 2007

(51) Int. Cl.
*G06F 17/50* (2006.01)
(52) U.S. Cl. ............... 716/11; 716/5; 716/6; 716/9; 716/10; 716/12
(58) Field of Classification Search ........... 716/11, 716/12, 5, 6, 9, 10
See application file for complete search history.

(56) References Cited

U.S. PATENT DOCUMENTS

| | | | |
|---|---|---|---|
| 4,577,276 A * | 3/1986 | Dunlop et al. ............ | 716/10 |
| 4,698,760 A | 10/1987 | Lembach et al. .......... | 716/6 |
| 4,924,430 A | 5/1990 | Zasio et al. ............. | 716/6 |
| 5,274,568 A | 12/1993 | Blinne et al. ............ | 716/6 |
| 5,491,641 A * | 2/1996 | Scepanovic et al. ........ | 716/13 |
| 5,572,437 A | 11/1996 | Rostoker et al. .......... | 716/18 |
| 5,617,325 A | 4/1997 | Schaefer ................. | 716/6 |
| 5,828,580 A * | 10/1998 | Ho ....................... | 716/12 |
| 5,841,672 A | 11/1998 | Spyrou et al. ............ | 716/6 |
| 5,875,114 A | 2/1999 | Kagatani et al. .......... | 716/6 |
| 6,009,248 A * | 12/1999 | Sato et al. .............. | 716/2 |
| 6,080,201 A | 6/2000 | Hojat et al. ............. | 716/10 |
| 6,189,131 B1 | 2/2001 | Graef et al. ............. | 716/8 |
| 6,317,861 B1 | 11/2001 | Hasegawa ................. | 716/6 |
| 6,463,567 B1 | 10/2002 | Kozai .................... | 716/2 |
| 6,532,577 B1 | 3/2003 | Mbouombouo .............. | 716/6 |
| 6,581,195 B2 | 6/2003 | Tanaka ................... | 716/5 |
| 6,880,141 B1 * | 4/2005 | Tetelbaum ................ | 716/6 |
| 7,159,202 B2 * | 1/2007 | Lee et al. ............... | 716/11 |
| 2002/0056070 A1 | 5/2002 | Tanaka ................... | 716/2 |
| 2004/0111688 A1 | 6/2004 | Lee et al. ............... | 716/12 |
| 2004/0216062 A1 | 10/2004 | Fan ...................... | 716/5 |

OTHER PUBLICATIONS

Burstein et al., "Timing-influenced layout design", IBM Technical Disclosure Bulletin, vol. 28, No. 11, Apr. 1986.
Luitjen, "Time-driven CMOS gate placement", IBM Technical Disclosure Bulletin, vol. 33, No. 1A, Jun. 1990.

* cited by examiner

*Primary Examiner*—Sun James Lin
(74) *Attorney, Agent, or Firm*—Suzanne Erez

(57) ABSTRACT

A method is provided for designing an integrated circuit. The method includes inserting wire model objects into the schematic of said circuit based on sizing and placement of components of the circuit, and performing an early timing analysis on said schematic. The steps of inserting and performing are repeated after re-sizing and/or re-placing the components if early timing analysis fails.

2 Claims, 3 Drawing Sheets

METHOD AND SYSTEM FOR ENHANCING CIRCUIT DESIGN PROCESS

FIELD OF THE INVENTION

The present invention relates generally to the field of integrated circuit ("IC") layout design. More specifically, the present invention relates to a method, system and computer program product for reducing the iteration required for correctly sizing components, meeting performance requirements (e.g. timing) and/or designing a layout of a circuit.

BACKGROUND

In designing an integrated electrical circuit, the circuit is expected to satisfy certain user-specified requirements. The creation of a complex circuit may involve creation of a topology, component sizing and placement, and also routing of wires that interconnect the circuit components.

By 'sizing' is meant assigning values to the circuit's components. By 'placement' is meant assignment to the circuit's components a particular physical location on; e.g., a printed circuit board or a silicon wafer. Placement data may, therefore, represent spatial coordinates (e.g., Xi; Yi) of the components. By 'routing' is meant assignment of a particular physical location to the wires in the circuit and, in particular, to the interconnection of wires between the leads of the circuit's components.

The physical location of each component and wire may affect the overall behavior of all circuits to some extent because electrical components may have interaction with one another based on their physical location. The electrical coupling between adjacent components, signal wiring and IC substrate, generally called parasitic effects, are generally small and may not be important to the performance of 'simple' circuits operating at relatively low frequencies. In such cases, parasitic effects may simply be factored out. By 'parasitic effect' is meant undesired effect caused by capacitance, resistance, and sometimes inductance, which are introduced by interconnecting adjacent wires. However, parasitic effects may detrimentally impact the performance of a more complex circuit or a circuit operating at relatively high frequencies, for example, at radio frequencies ("RF"). Under such circumstances, it may be impossible to design a practical circuit without factoring in probable parasitic effects.

Interconnection wirings may affect different circuits in different ways. For example, synchronization is essential for the proper functionality of many digital circuits. However, 'bad' wiring routing may 'force' the circuit out of synchronization because it may undesirably impact the time required for an electrical signal to travel between two components along a certain wire or wiring path.

With the ongoing miniaturization of semiconductor components and integrated circuits into the nanometer domain in past years, the importance and affect of parasitic effects upon the design of a circuit is constantly increasing. This is, due to the fact that at smaller scales, previously unimportant parasitic effects are now magnified. Therefore, when designing microelectronic circuit, a microelectronics engineer has an additional task, which is to find ways to minimize and overcome these effects while always delivering smaller and faster components.

Because parasitic effects can render microelectronic circuits useless, if ignored or mishandled, a validation process is included in the layout-designing phase of IC circuits. Typically, a validation process includes the performance of iterative steps, elements resizing in the schematic level, layout adjustments (of both components' placement and their interconnectivity), parasitic information extraction, post-layout timing analysis and layout returning. A parasitic extraction process analyzes the layout and, based on geometry and technology properties, creates additional simulation models, which are then used in circuit timing analysis.

Timing closure of large full custom circuits in sub-micron technologies operating at GHz frequencies has become a lengthy process that typically involves many iterative steps. The timing closure phase, which is required to evaluate the performance of the IC circuit, involves the evaluation of temporal delays caused by parasitic effects of interconnection wirings and, sometimes, by "via" connections between different signal layers. The association between wires (and, where relevant, "via" connections between layers) to the delays they cause is sometimes referred to as "delay models", or "wire models".

Traditional systems used for circuit design suffer from several drawbacks. In order to elaborate on these drawbacks, a reference is made now to FIG. 1.

FIG. 1 exemplifies a traditional full custom circuit design flow. At step 101, after the logical design of the full custom circuit is completed, a first data file is generated that represents, inter alia, the original schematic design of the integrated circuit. The original schematic design file (herein simply 'schematic design file') may be generated using traditional methods.

The various circuit components are initially sized, at step 102, and a preliminary timing analysis is performed, at step 103, based mainly on intuition, and/or guesswork, and/or accumulative experience in the field of IC design. The first data file may also include data relating to the size of the various components of the circuit. The preliminary timing analysis is typically implemented by manually adding wire model objects to the circuit schematics (more specifically to the first schematic file). Being inserted manually, delay models can be used only in respect of a relatively small number of wires. For this reason, a circuit designer has first to intuitively identify wires as 'critical wires' and then construct wire models in respect of the 'critical' wires.

The latter conduct is problematic in two aspects. First, the circuit designer may erroneously consider non-critical wires as critical. Secondly, the circuit designer may inadvertently ignore 'real' critical wires. Therefore, using delay models in the traditional manner is far from being an adequate solution for a circuit that consists of many components (e.g., logic gates). Put simply, it is impractical to manually construct an accurate delay model for a large number of wires. Therefore, in placing the circuit's components, at step 104, only an incomplete 'picture' of the parasitic effects is factored in, which ill affects the other processes involved in the circuit design by rendering them very lengthy and troublesome, as explained hereinafter. Partial solution to this problem involves repeating steps 102 and 103 (103/1), though using, wire model objects in the traditional manner (at step 103) cannot significantly shorten the circuit's designing process or mitigate the drawbacks associated with it.

Then, the circuit's components, each assigned an initial size (102), are physically placed, at step 104, and routed, at step 105, to form the layout of the circuit. The layout is then checked, by employing one or more verification procedures known in the field as design rule checking ("DRC"), layout versus schema ("LVS") and methodology checks ("METH"). Briefly, DRC generally concerns checking the conformity to technology constraints, or to design rules. LVS generally concerns checking equivalency between the layout and the schema. METH generally concerns conformity to methodology constraints.

If the layout meets the requirements/constraints at step 106, an "extraction" stage is performed, at step 107, in which the candidate circuit's layout is converted into a 'netlist', which includes all circuit components and interconnect (wiring) parasitics at step 107.

Then, a post layout timing analysis is performed, at step 108, for evaluating the real time performance of the circuit. If the layout (106) fails to satisfy the timing analysis at step 108, components of the circuit are re-sized, at step 109, re-placed, at step 110 and re-routed, at step 111. Then, the resulting layout is checked (112), its parasitics are extracted (113) and it undergoes a final timing analysis (114), the procedures 112 to 114 being similar to the procedures 106, 107 and 108, respectively. The latter three steps (112 to 114) may be collectively thought of as a "validation procedure" (118). If a layout successfully passes the validation procedure (118), it is considered a "final layout" (115) that may be used for mass fabrication. However, if the layout (112) is invalidated, components are, again, re-sized (109), re-placed (110) and re-routed (111). Timing closure loop 116 continues until final layout results.

Simulating a circuit (i.e., testing it in the schematic level) is preferable over testing physical circuit layout, both in time and costs. In respect of this it is noted that both the post layout timing analysis and the final timing analysis are done in respect of the layout of the (i.e., physical) circuit. It is also noted that wire model objects are used only in a very early stage of the designing process (at step 103), with all the drawbacks described herein and before routing issues are addressed (at step 105).

As explained hereinbefore, because only critical wires are modeled (103), comprehensive timing analysis cannot be accurately performed in the schematic level. Therefore, accurate timing closure cannot be achieved in the schematic level but, rather, it is performed only at a post layout process (at step 108), which is relatively a late stage in the IC's designing process. Having to time-wise analyze circuit layouts, rather than circuit schematics, results in executing many lengthy processes (i.e., 106 to 108, and 112 to 114) before a decision may be reached as to whether another iteration (116) should be made in trying to converge to a feasible layout that meets the required circuit performance.

Therefore, every optimization iteration, or loop (116), takes a considerable amount of time. In addition, due to the incomplete 'picture' of the parasitic effects many iterations (116) are executed before reaching time closure on a feasible circuit layout. Depending on the circuit complexity, optimization iterations through full layout design cycles (116) may take very long time (e.g., several weeks).

Therefore, a need exists for enhancing the design process associated with circuit layout design. Another need exists for significantly reducing the time period required to design a large full custom circuit. A further need exists for allowing running accurate timing simulations on the schematic level. A further need exists for reducing the number of iterations involved in the layout design and validation process and also to reduce the duration of each iteration.

SUMMARY OF THE INVENTION

According to the present invention, the number of design iterations required for designing a circuit is significantly reduced by appropriate parasitics modeling in the early schematic level of the circuit. Proper modeling of parasitic loads due to interconnect wiring enables accurate timing analysis in the schematic level through use of a 'wire model generator', which substitutes (in the schematic sense) many or all logical connection in the circuit with one or more wire model objects. Performing accurate time analysis in the schematic level allows for significantly reducing the number of iterations involved in the layout design and in the validation process, and as a result may reduce the time period required to complete each iteration of the design.

According to some embodiments of the present invention, a design flow of large circuits is provided. The rearranged design flow, when executed on large full custom circuits, facilitates the reduction of the complete design cycle, from the point of circuit schematics to a fully validated and performance matching finished layout (e.g., from weeks to days). The provided design flow introduces the concept of generating an equivalent circuit schematic, 'populated' with a comprehensive set of geometrically calculated wire model objects, which enables accurate early timing closure in the schematic design phase. The accurate timing closure in the schematic level is achieved through short and easy early timing analysis iterations (on the enhanced circuit schematics), thus saving the lengthy iterations through completely validated circuit layout and parasitic extraction.

According to some embodiments of the present invention by using some of the principles disclosed in the present invention, only one layout construction and validation pass is typically required, and rarely two iterations may be needed, instead of many labor intensive and time consuming iterations.

According to some embodiments of the present invention, the present invention is a method, system and computer program product useful in designing an integrated circuit. The method may comprise inserting wire model objects ("WMOs") into the schematic of the circuit based on sizing and placement of components of said circuit, performing an early timing analysis ("ETA") on said schematic; and repeating these steps of inserting and performing after re-sizing and/or re-placing said components if said ETA fails.

According to some embodiments of the present invention inserting includes deriving a second schematic file from a first schematic file relating to the logical connections in the circuit and to physical size of components of the circuit, and from a placement data relating to physical locations of said components, and inserting the wire model objects into said second schematic file by:
  a. estimating a wiring routing geometry for each signal path in the circuit;
  b. selecting one or more cascading wire model objects ("WMOs") for each segment in each geometry; and
  c. substituting each signal path with the respective one or more WMOs;

According to some further embodiments of the present invention, wire model objects may be inserted according to optimized wires' routing geometries. In one aspect, the wire model objects may be selected from a library of wire model objects, wherein each selection may be based on a predefined set of selection rules.

According to some embodiments of the present invention, the optimized wires' routing geometries may be generated by employing computational geometry algorithms (e.g., for computing Rectilinear Steiner Trees) to calculate optimized estimations for the anticipated interconnection routing geometries according to the placement data.

According to some embodiments of the present invention, the method may further comprise: (i) completing the layout of the circuit by incorporating it's wire routing, based on the most recently updated (or generated) first file and placement data, (ii) validating the completed layout, and (iii) if the final timing analysis fails, updating the (or generating a new) first schematic file and, if required, modifying said (or generating a new) placement data accordingly, and repeating the latter steps (i) and (ii) until passing final timing analysis, to obtain final timing closure for said circuit.

According to some embodiments of the present invention, a computer program product is also disclosed for designing an integrated circuit. The computer program product may comprise a computer useable medium that may include a computer readable program. The computer readable program, when executed on a computer, may cause the computer to insert WMOs into the schematic of the circuit based on sizing and placement of components of the circuit, to perform an ETA on the schematic, and to repeat the steps of inserting and performing after re-sizing and/or re-placing the components if said ETA fails.

According to some embodiments of the present invention, the step of inserting may also comprise deriving a second schematic file from a first schematic file relating to the logical connections in the circuit and to physical size of components of said circuit, and from a placement data relating to physical locations of said components by:

a. estimating a wiring routing geometry for each signal path in the circuit;
 b. selecting one or more cascading wire model objects ("WMOs") for each segment in each geometry; and
 c. substituting each signal path with the respective one or more WMOs;

wherein the early timing analysis ("ETA") is performed on the second schematic file; and wherein the first schematic file is re-generated or updated according to the re-sizing and/or re-placing of the components.

According to some embodiments of the present invention, a system is also disclosed for designing an integrated circuit. The system may comprise a wire model objects generator ("WMG") for generating and inserting wire model objects ("WMOs") into the schematic of the circuit based on sizing and placement of components of said circuit, an early timing analyzer for performing an early timing analysis ("ETA") on the schematic, and a central processor for causing the generator to generate and insert the WMOs, and for generating and inserting new WMOs after re-sizing and/or re-placing said components, if the ETA fails.

According to some embodiments of the present invention, the WMG may comprise a connectivity and placement extractor for extracting from the first schematic file the connectivity and placement data.

The WMG may further comprise a geometry estimator ("GE") for utilizing the extracted connectivity and placement data to estimate a corresponding wiring routing geometry for each signal in the circuit. The geometry may consist of one or more source and target points interconnected by line segments. According to some further embodiments of the present invention, the GE may estimate the routing geometry using different computational algorithm's (e.g. Rectilinear Steiner Trees).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
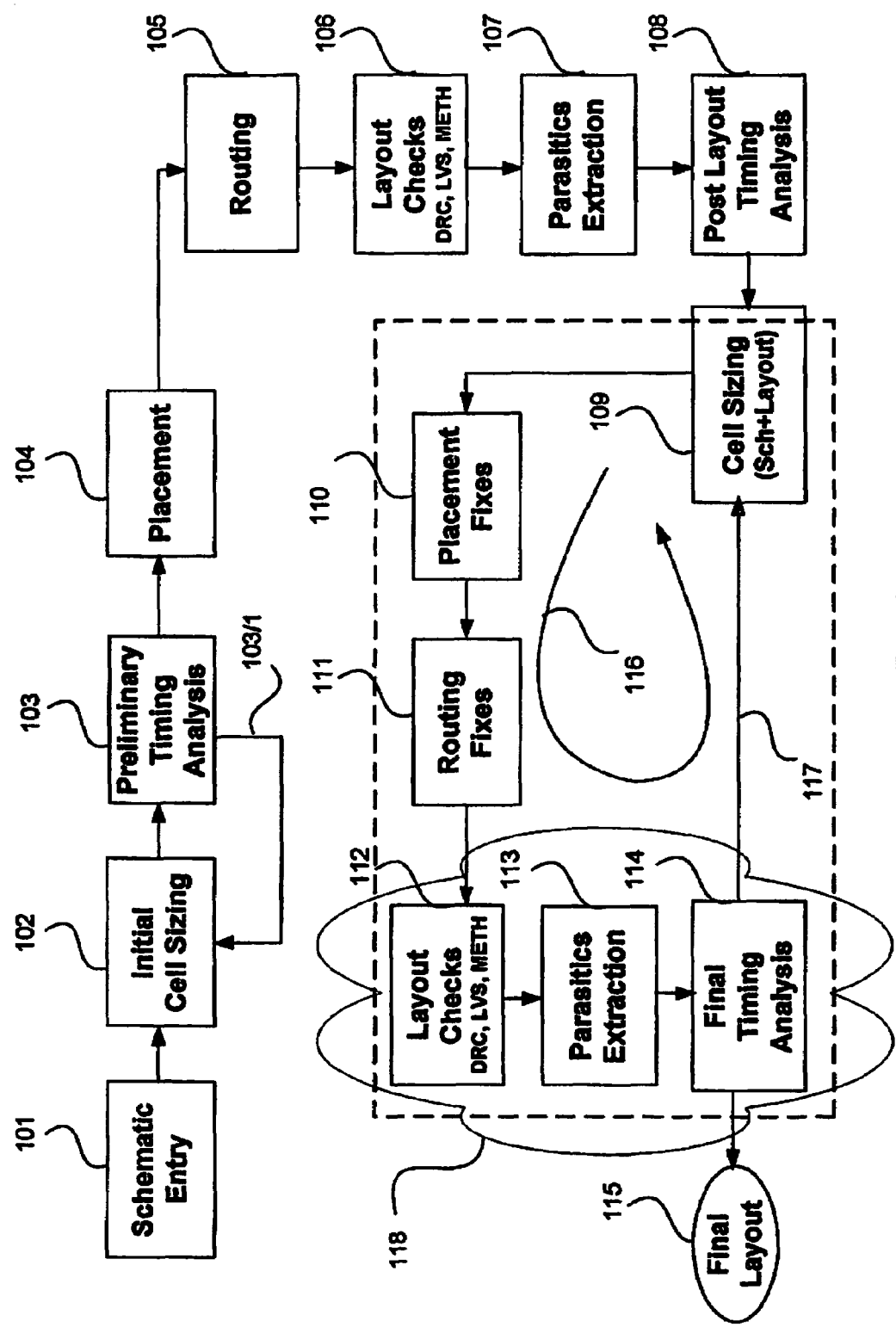
FIG. 1 (prior art) shows an exemplary traditional design flow involved in the designing of full custom circuits.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding, analogous or like elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing component, that manipulate and/or transform data represented as physical, such as electronic, quantities within the computing system's registers and/or memories into other data similarly represented as physical quantities within the computing system's memories, registers or other such information storage, transmission or display components.

The invention may take the form of an entirely hardware embodiment, an entirely software embodiment or an embodiment containing both hardware and software elements. In a preferred embodiment, the invention is implemented in software, which includes but is not limited to firmware, resident software, microcode, etc.

Embodiments of the present invention may include apparatuses for performing the operations described herein. This apparatus may be specially constructed for the desired purposes, or it may comprise a general purpose computer selectively activated or reconfigured by a computer program stored in the computer.

Furthermore, the invention may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or component.

The medium may be an electronic, magnetic, optical, electromagnetic, infrared, or semiconductor system (or apparatus or component) or a propagation medium. Examples of a computer-readable medium include a semiconductor or solid state memory, magnetic tape, magnetic-optical disks, a removable computer diskette, a random access memory (RAM), a read-only memory (ROM), a rigid magnetic disk, an optical disk, electrically programmable read-only memories (EPROMs), electrically erasable and programmable read only memories (EEPROMs), magnetic or optical cards, or any other type of media suitable for storing electronic instructions, and capable of being coupled to a computer system bus. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code has to be retrieved from bulk storage during execution.

Input/output or I/O components (including but not limited to keyboards, displays, pointing components, etc.) can be coupled to the system either directly or through intervening I/O controllers.

Network adapters may also be coupled to the system to enable the data processing system to become coupled to other data processing systems or remote printers or storage components through intervening private or public networks. Modems, cable modem and Ethernet cards are just a few of the currently available types of network adapters.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 2:
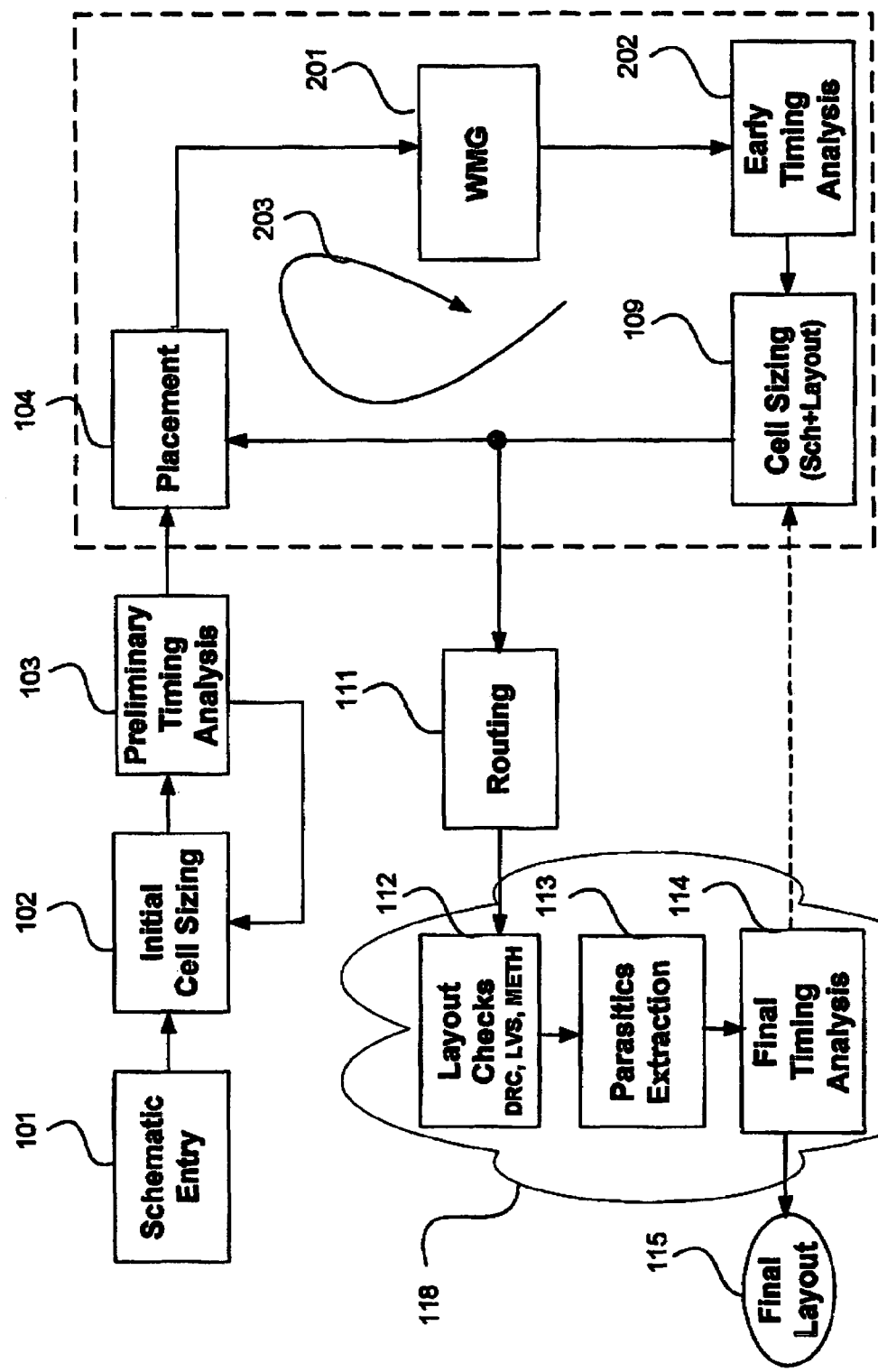
FIG. 2 shows an exemplary design flow according to some embodiments of the present invention.

FIG. 2 depicts an exemplary design flow of a circuit according to some embodiments of the present invention. Steps 101 to 104, 109 and 111 to 115 are described hereinbefore in connection with the traditional design flow shown in FIG. 1.

According to some embodiments of the present invention, a novel timing analysis procedure will be described hereinafter, which will enable fast timing closure for circuits design. At step 201, a wire model objects ("WMOs") generator ("WMG") automatically derives a second schematic file from the first schematic file by creating one or more wire model objects ("WMOs") for each and every signal in the circuit and by inserting the WMOs into the circuit schematics in the second schematic file. The insertion of the WMOs may be based on the placement data relating to the circuit whose layout is to be designed. More specifically, the WMOs are schematically and seamlessly incorporated into the original circuit schematic diagram such that in the second schematic file, the circuit's components are interconnected, in the schematic sense, via one or more corresponding WMOs that reflect estimated parasitic effects associated with 'real' wires (that is, if they were actually used in a final layout of the circuit) through which the corresponding signals are intended to flow.

As stated before, it is possible for every logical connection in the first (i.e., original) schematics to be substituted in the second (i.e., equivalent) schematic file by a corresponding one or more wire model objects. In addition, corresponding WMOs may substitute "via" connections to represent their estimated parasitic effects. Therefore, as far as parasitic effects are concerned, the derived second schematic is a fully comprehensive model, which allows performing a full timing analysis in the schematic level, at step 202, which is beneficial both in time and costs.

Wherever appearing herein, 'wire model object' refers to any suitable simulation object useful in simulating parasitic effects of wires. For example, the way wire model objects are selected to represent parasitic effects of interconnection wires and "via" connections and the way the WMOs are incorporated into a circuit scheme are each described in a different co-pending patent application from the same applicant.

At step 202, an early timing analysis ("ETA") may be performed on the second schematic file. If the ETA fails, an alternative placement is sought, which will result in a different (i.e., newly generated or modified) placement data, from which new or modified second schematic file may be derived (at step 104). By 'alternative placement is sought' is generally meant updating the first schematic file or generating a new first schematic file by re-sizing and/or re-locating one or more components of the circuit (at steps 109 and 104, respectively). Updating the first schematic file or generating a new schematic file may comprise changing the size of one or more components of the circuit. The latter process may iterate (via loop 203) until favorable timing analysis results, again, at step 202, at which stage the timing closure for the circuit is accomplished, meaning that a theoretically feasible layout with required performance results.

The ETA may be performed in an early stage of the circuit's design process thanks to the second (i.e., equivalent) schematic design file being comprehensive, which provides for carrying a comprehensive ETA in the schematic level, before reaching the circuit's layout construction stage.

In general, when the ETA is favorable, the performance of the circuit that will result from the most recently obtained sizing and placement data, will probably meet the predefined functional requirements. This way, a functional working design is created which is a candidate for fabrication. Since the ETA is performed on the schematic level, the 'timing closure' process is more efficient in many different aspects of IC layouts design, as discussed herein.

Put differently, if the timing analysis (202) is favorable, a layout is completed by routing real interconnection wires, at step 111, according to the most recently obtained sizing and placement data (109 and 104, respectively). The layout will be eventually used for mass fabrication if it passes the validation procedures 118.

Wire model objects may be inserted, or incorporated into the first schematic file, according to optimized wires' routing geometries. Wire model objects may be selected from a library of wire model objects, wherein each selection may be based on a predefined set of selection rules. Optimized wires' routing geometries may be generated by employing computational geometry algorithms. An exemplary computational geometry algorithm may compute Rectilinear Steiner Trees that are useful in calculating optimized estimations for anticipated interconnection routing geometries according to a given placement data. More specifically, given actual locations of components of a given circuit (i.e., the placement data), corresponding Rectilinear Steiner Trees may be formulated to estimate actual wiring routings for the given circuit. Nevertheless, it should be clear to one of ordinary skill in the art that Rectilinear Steiner Trees like algorithms are only an example, and any other computational algorithm, known today or to be devised in the future, may be applicable to the present invention.

The method of the present invention may further comprise: (i) completing the layout of the circuit by adding real wires (step 111) based on the most recently updated first file and placement data, (ii) validating the completed layout, at steps 118 and, if the layout is invalidated by failing to pass the final timing analysis (114) (iii) repeating the step of updating the first schematic file and placement data.

Referring again to FIG. 1, since the preliminary timing analysis (step 103) is mostly based on intuition and using rules of thumb, as variously stated hereinbefore, the lengthy processes (i.e., steps 111 to 113) have to be iterated (116) many times, until the final timing analysis (114) is favorable. As stated hereinbefore, depending on the circuit complexity, optimization iterations through full layout design cycles (116) may take a considerable amount of time (e.g., several weeks).

According to some embodiments of the present invention, the novel timing closure loop (203) is faster than the traditional timing closure loop 116 because that it is being performed on the circuit's schematic level, vs. the traditional manual timing closure on the circuit's layout, thus saving the tedious timing consuming phases of routing fixes (111) and layout validation (118). Referring again to FIG. 2, though steps 111 to 114 still have to be performed to either validate or invalidate the resulting circuit layout, these lengthy steps are typically performed once or twice at the most. Furthermore, should the final timing analysis 114 fail, additional faster iterations (203) may be performed to converge to a feasible layout, vs. performing additional lengthy iterations (116) in the traditional manner.

Utilizing a wire model generator ("WMG") at step 201 and employing an early timing analysis at step 202 not only saves time by reducing the number of iterations involved in the time-wise problematic steps 111 to 113 but, in addition, the traditional time-wise problematic steps 105 to 108 (FIG. 1) are excluded from the 'design loop' as well. This way, the optimization loop's time is considerably reduced, and so is the total amount of time required for obtaining a feasible full custom circuit layout. Put differently, due to the accurate timing analysis and accurate timing closure in the schematic level, the number of timing iterations through full layout is generally reduced to one iteration, and rarely a second iteration may be required.

According to some embodiments of the present invention, a computer program product is also provided, which comprises a computer useable medium that includes a computer readable program. The computer readable program, when executed on a computer, may cause the computer to perform the steps, or process, described hereinbefore.

Figure 3:
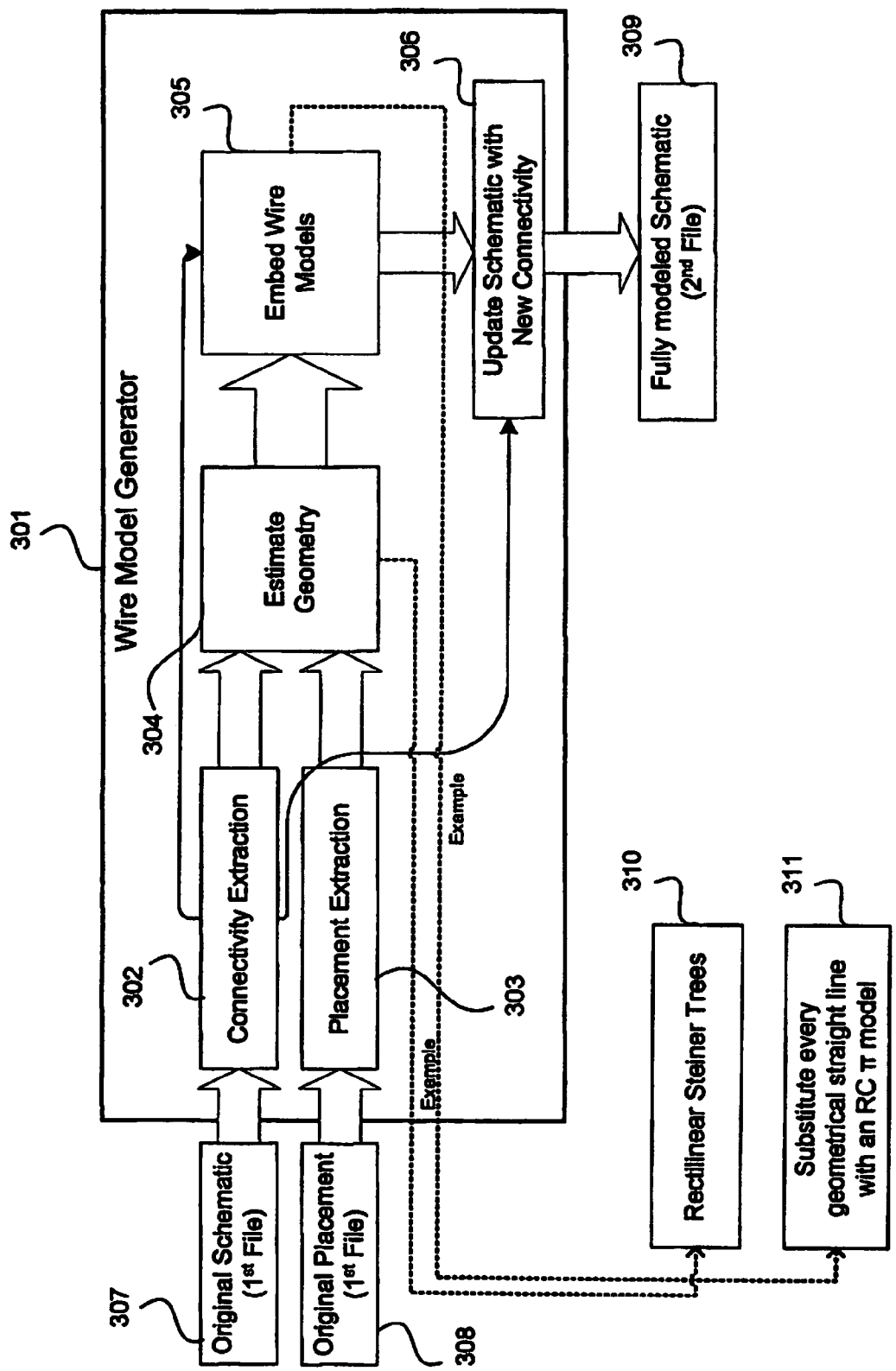
FIG. 3 schematically illustrates the general functionality and layout of the system according to some embodiments of the present invention.

Referring to FIG. 3, it schematically illustrates the general functionality and layout of the system according to some embodiments of the present invention. The system may comprise: a wire model generator ("WMG") 301 for retrieving from a first file associated with the circuit connectivity data (302) and placement data (303). The retrieved connectivity and placement data may be utilized to generate a second schematic file in which wire model objects ("WMOs") seamlessly substitute, in the schematic sense, the logical connections in the circuit schematic, whereby to create a fully modeled circuit schematic.

The WMG (301) may comprise a connectivity and placement extractor (302 and 303, respectively) for extracting from the first schematic file the connectivity and placement data. The WMG 301 may further comprise a geometry estimator ("GE") 304 for utilizing the extracted connectivity and placement data to estimate a corresponding wiring routing geometry for each signal in the circuit. The geometry may consist of one or more source and target points interconnected by line segments. The GE 304 may estimate the routing geometry using; e.g., a Rectilinear Steiner Tree like (310) algorithm.

The WMG 301 may further comprise a wire model embedder ("WME") 305 for deciding the number and type of WMOs each segment and "via" connection will be substituted with. For example, WME 305 may decide to substitute every segment in the geometry with a resistor-capacitor arrangement known in the art as 'RC-$\pi$' model (311).

The WMG 301 may further comprise an insertion means 306 for generating the second schematic file by inserting the WMOs into the circuit schematic. The insertion means 306 may decide to add intermediate nodes to the resulting (i.e., updated or second) circuit schematic file to accommodate for cascading WMOs.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A system for designing an integrated circuit, comprising:
   a) a wire model objects generator ("WMG") for generating and inserting wire model objects ("WMOs") into a schematic of said integrated circuit based on sizing and placement of components of said intergrated circuit;
   b) an early timing analyzer for performing an early timing analysis ("ETA") on said schematic; and
   c) a central processor for causing said WMG to generate and insert said WMOs, and for generating and inserting new WMOs after re-sizing and/or re-placing said components, if said ETA fails, wherein the WMG comprises:
   a connectivity and placement data extractor for retrieving from a first schematic file connectivity and placement data;
   a geometry estimator ("GE") for utilizing the retrieved connectivity and placement data to estimate a corresponding wire routing geometry for each signal in the integrated circuit, said wire routing geometry consists of one or more source and target points interconnected by line segments;
   a wire model embedder ("WME") for deciding a number and type of WMOs each segment and "via" connection will be substituted with; and
   an insertion means for generating a second schematic file by inserting the WMOs into the schematic of said integrated circuit, said insertion means determines where to add intermediate nodes to the second schematic file to accommodate for cascading WMOs.

2. The system according to claim 1, wherein the GE estimates the wire routing geometry using a Rectilinear Steiner Tree like algorithm.

* * * * *